(12) United States Patent
Ozgun et al.

(10) Patent No.: US 8,494,473 B2
(45) Date of Patent: Jul. 23, 2013

(54) PROCESSING A RADIO FREQUENCY SIGNAL

(75) Inventors: Mehmet T. Ozgun, Plano, TX (US); Essam Atalla, Plano, TX (US)

(73) Assignee: Icera Inc., Wilmington, DE (US)

( * ) Notice: Subject to any disclaimer, the term of this patent is extended or adjusted under 35 U.S.C. 154(b) by 99 days.

(21) Appl. No.: 13/089,808

(22) Filed: Apr. 19, 2011

(65) Prior Publication Data
US 2012/0269307 A1 Oct. 25, 2012

(51) Int. Cl.
*H04B 1/10* (2006.01)
(52) U.S. Cl.
USPC .................... 455/307; 455/283; 455/323
(58) Field of Classification Search
USPC ............... 455/283, 286, 307, 323, 339, 190.1
See application file for complete search history.

(56) References Cited

U.S. PATENT DOCUMENTS

| | | | |
|---|---|---|---|
| 2001/0007151 A1* | 7/2001 | Vorenkamp et al. | 725/151 |
| 2003/0224746 A1 | 12/2003 | Contopanagos et al. | |
| 2006/0128340 A1 | 6/2006 | Hsieh et al. | |
| 2008/0227409 A1* | 9/2008 | Chang et al. | 455/78 |
| 2009/0280766 A1 | 11/2009 | Rofougaran et al. | |
| 2011/0210903 A1* | 9/2011 | Sarabandi et al. | 343/904 |

FOREIGN PATENT DOCUMENTS

| | | |
|---|---|---|
| DE | 3337030 C2 | 5/1985 |
| JP | 2000013357 A | 1/2000 |
| WO | 2004109941 A1 | 12/2004 |
| WO | 2008112800 A2 | 9/2008 |

OTHER PUBLICATIONS

Gianni, F., et al., "High-Q gyrator-based monolithic active tunable bandstop filter," IEEE Proceedings—Circuits Devices Syst., vol. 145, No. 4, Aug. 1998, pp. 243-246.
Park, S., et al., "An Improved Wide-Dynamic Range Tunable RF Interference Suppression Notch Filter," IEEE, 2010, pp. 1033-1036.
Combined Search and Examination Report under Sections 17 and 18(3), GB Application No. 1206897.9, Aug. 20, 2012, 8 pages.
Foreign Communication From a Related Counterpart Application, Great Britain Application No. 1206897.9, Great Britain Office Action dated May 7, 2013, 3 pages.

* cited by examiner

*Primary Examiner* — Christian Hannon

(57) ABSTRACT

Circuitry and a method for use in a radio frequency receiver for processing a radio frequency signal are provided. The circuitry comprises a mixer arranged to receive the radio frequency signal and down-convert the received radio frequency signal to a lower frequency. The received radio frequency signal has an interference component and the interference component in the down-converted signal is within an interference frequency range. The circuitry also comprises an LC based notch filter arranged to receive the down-converted signal from the mixer, filter the down-converted signal, and output the filtered signal for processing by a baseband processing block. The LC based notch filter has a notch centered within said interference frequency range, such that the LC based notch filter is arranged to attenuate the interference component in the down-converted signal.

14 Claims, 10 Drawing Sheets

US 8,494,473 B2

PROCESSING A RADIO FREQUENCY SIGNAL

TECHNICAL FIELD

The present invention relates to a method and circuitry for processing a radio frequency signal. In particular the present invention relates to the use of a mixer to down-convert a radio frequency signal received at a radio frequency receiver, e.g., in the presence of strong interference.

BACKGROUND

Many communication systems allow communication over wireless interfaces by allowing radio frequency signals to be transmitted and received between devices. Radio frequency signals which are received at a receiver can be down-converted to frequencies which are lower than radio frequency for processing by a baseband processing block in the receiver.

For example, FIG. 1 shows a schematic diagram of a Radio Frequency (RF) receiver 100. The RF receiver 100 includes an antenna 102, a low-noise amplifier (LNA) 104, a mixer block 106, and a baseband processing block 108. The antenna 102 is coupled to an input of the LNA 104. An output of the LNA 104 is coupled to an input of the mixer block 106. An output of the mixer block 106 is coupled to an input of the baseband block 108. In operation, the antenna 102 receives radio frequency signals over the communication system and passes the signals to the LNA 104. The LNA 104 amplifies the signals and passes them to the mixer block 106. The mixer block down-converts the radio frequency signals to provide lower frequency signals to the baseband processing block 108, where the signals are processed. As is known in the art, the processing in the baseband processing block 108 may include analog-to-digital conversion of the signal, demodulation of the signal, and decoding of the signal. Interference components in the signal that is passed to the baseband processing block 108 may increase the requirements (such as the linearity and filtering requirements) of the baseband processing block 108 in order to correctly process the signal.

SUMMARY OF THE INVENTION

According to a first aspect of the invention there is provided an embodiment of circuitry for use in a radio frequency receiver for processing a radio frequency signal. The circuitry comprises a mixer and an LC based notch filter. The mixer is arranged to receive the radio frequency signal and down-convert the received radio frequency signal to a lower frequency. The received radio frequency signal has an interference component. The interference component in the down-converted signal is within an interference frequency range. The LC based notch filter is arranged to receive the down-converted signal from the mixer, filter the down-converted signal, and output the filtered signal for processing by a baseband processing block. The LC based notch filter has a notch centered within the interference frequency range, such that the LC based notch filter is arranged to attenuate the interference component in the down-converted signal.

According to a second aspect of the invention there is provided an embodiment of a radio frequency receiver for processing a radio frequency signal. The radio frequency receiver comprises a mixer, an LC based notch filter, and a baseband processing block for processing a filtered signal outputted from the LC based notch filter. The mixer is arranged to receive the radio frequency signal and down-convert the received radio frequency signal to a lower frequency. The received radio frequency signal has an interference component. The interference component in the down-converted signal is within an interference frequency range. The LC based not filter is arranged to receive the down-converted signal from the mixer, filter the down-converted signal, and output the filtered signal. The LC based notch filter has a notch centered within the interference frequency range, such that the LC based notch filter is arranged to attenuate the interference component in the down-converted signal.

According to a third aspect of the invention there is provided an embodiment of a method of processing a radio frequency signal in a radio frequency receiver. The method comprises receiving the radio frequency signal at a mixer of the radio frequency receiver, down-converting the received radio frequency signal to a lower frequency using the mixer, passing the down-converted signal from the mixer to an LC based notch filter of the radio frequency receiver, filtering the down-converted signal with the LC based notch filter, and outputting the filtered signal from the LC based notch filter for processing by a baseband processing block. The received radio frequency signal has an interference component. The interference component in the down-converted signal is within an interference frequency range. The LC based notch filter has a notch centered within the interference frequency range, such that the LC based notch filter attenuates the interference component in the down-converted signal.

BRIEF DESCRIPTION OF THE DRAWINGS

For a better understanding of the present invention and to show how the same may be put into effect, reference will now be made, by way of example, to the following drawings in which.

DETAILED DESCRIPTION

The inventors have realized that a notch filter can be used to filter the output signals from a mixer in a radio frequency receiver to thereby advantageously provide a high level of attenuation of interference components in the output signals. This allows the requirements (such as linearity requirements) in downstream processing blocks to be relaxed because the signal contains less interference. Furthermore, this may be achieved without increasing the inband droop of the desired signal components of the signal output from the mixer.

By using an LC based notch filter the notch of the notch filter can be centered within the interference frequency range to thereby preferentially attenuate the interference component in the signal. This relaxes the linearity and filtering requirements of subsequent processing blocks in the receiver, e.g., the baseband processing block. The receiver may be part of a transceiver and the interference component may be caused by a transmitted signal transmitted from the transceiver, in which case the frequency of the interference component is known and the notch of the notch filter may be adjusted to be centered within the interference frequency range caused by the transmitted signal.

Figure 1:
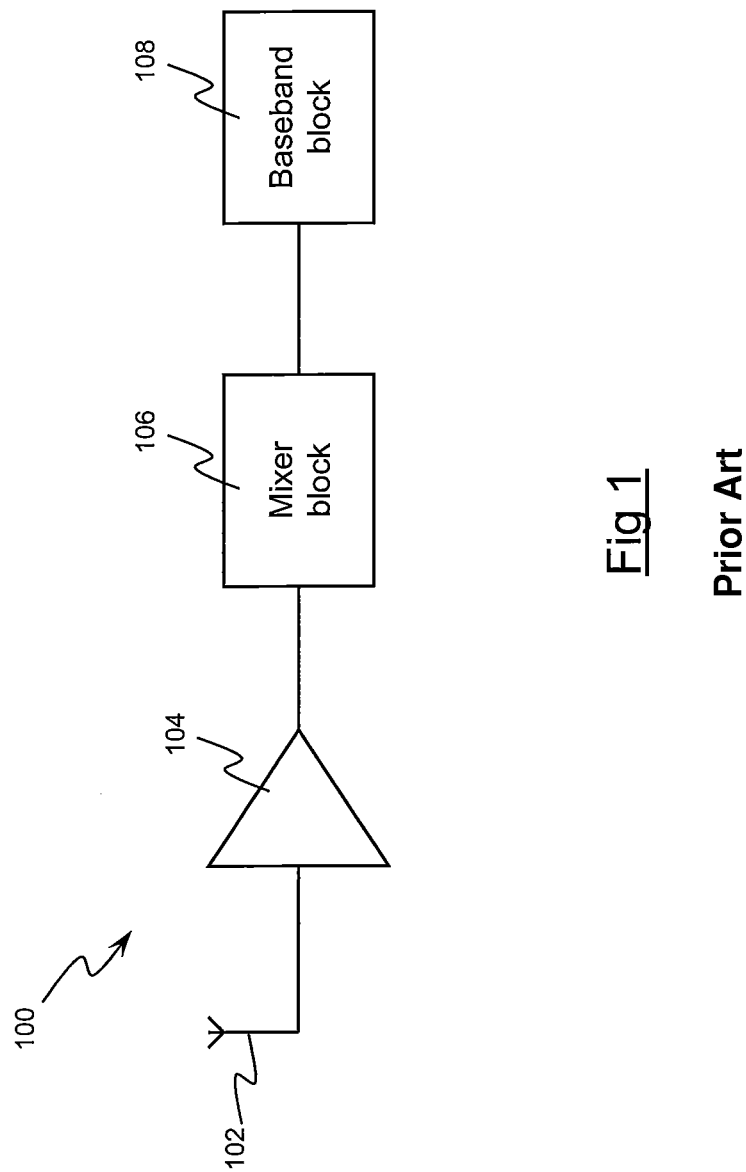
FIG. 1 shows a schematic diagram of a radio frequency receiver.
Figure 2:
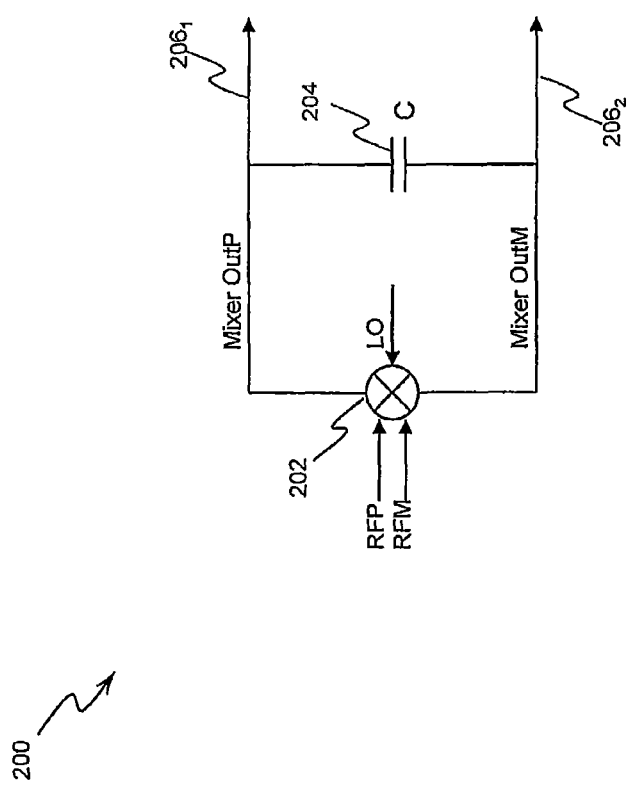
FIG. 2 shows a circuit diagram of an example mixer block according to one system.

FIG. 2 shows a circuit diagram of an example mixer block 200 according to one system. The mixer block 106 comprises a mixer 202, a capacitor 204, and two output lines $206_1$ and $206_2$. FIG. 2 shows that the input to the mixer block 200 is a differential input denoted RFP and RFM, and the differential inputs are received at the mixer 202 (FIG. 1 does not show that the inputs to the mixer block 106 are differential inputs for simplicity of the figure). The mixer 202 also receives a local oscillator (LO) signal which is generated by a local oscillator on the receiver 100 and which acts as a clock signal having a particular frequency $f_{LO}$. The mixer 202 outputs a differential output signal which is output on the two output lines $206_1$ and $206_2$. The capacitor 204 is connected between the two output lines $206_1$ and $206_2$. Capacitors block low frequency signals but allow high frequency signals to pass through them. Therefore, high frequency components of the signal output from the mixer 202 can pass between the differential output lines $206_1$ and $206_2$, such that the high frequency components of the differential output from the mixer 202 are blocked by the capacitor 204. However, low frequency components of the signal output from the mixer 202 cannot pass between the differential output lines $206_1$ and $206_2$ through the capacitor 204, such that the low frequency components of the differential output from the mixer 202 are not blocked by the capacitor 204 and are passed on to the baseband processing block 108 from the mixer block 200. In this way the capacitor 204 acts as a low-pass filter applied to the differential output of the mixer 202. The cut off frequency of the low pass filter resulting from the capacitor 204 is the frequency of the highest frequency component of the signal output from the mixer 202 which is not blocked by the low pass filter resulting from the capacitor 204. Changing the capacitance of the capacitor 204 will change the cut off frequency applied to the output signal from the mixer 202.

The desired signal component in the output signal from the mixer 202 may be known to be within a particular frequency range (e.g., 0 to 10 MHz). It can be useful to block frequencies outside of the frequency range of the desired signal component to thereby reduce the interference experienced by the desired signal component in the received signal. For example, the capacitor 204, acting as a low pass filter, can be used to block frequencies which are above the frequency range of the desired signal component. There may be interfering (or "blocking") signals at particular frequencies and it may be desirable to filter the interference caused by these interfering signals from the signal output from the mixer 202. The interfering signals may be caused by a number of different sources. For example, the receiver might be a transceiver which transmits radio frequency signals as well as receiving radio frequency signals, and the transmitted signals may be the cause of interference in the received signal. This is a particular problem for a transceiver operating in a user terminal in a mobile communication system when the user terminal is located at the edge of a cell of the mobile communication system. The power of the transmitted signal will be relatively high compared to the power of the received signal at the user terminal. Interference caused by the transmitted signals is known as transmitter leakage, and handling transmitter leakage is an important factor in optimizing the performance of a receiver. The frequency of the transmitted signals is known, and as such the filter applied to the received signal can be adjusted to filter out the interference caused by the transmitter leakage.

Figure 3:
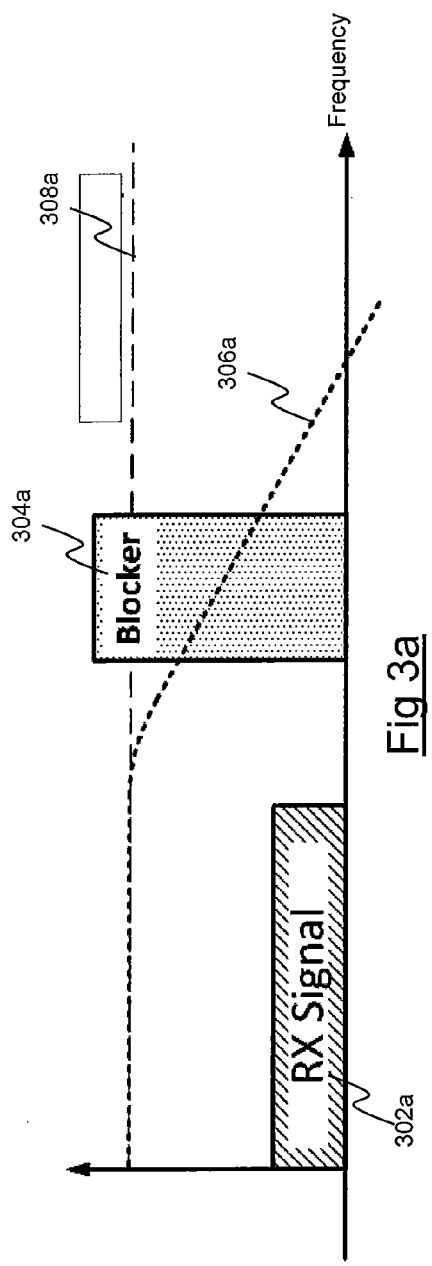
FIG. 3a shows a graph representing the effect of a capacitor on the signal output from a mixer according to a first situation.
FIG. 3b shows a graph representing the effect of a capacitor on the signal output from a mixer according to a second situation.

FIGS. 3a and 3b show graphs representing the effect of the capacitor 204 on the signal output from the mixer 202. FIG. 3a shows the desired signal component 302a (denoted "RX Signal" in FIG. 3a) which has a frequency range of approximately 0 to 10 MHz. At a higher frequency there is some interference component 304a in the signal (denoted "Blocker" in FIG. 3a). The frequency range of the interference component 304a could be any frequency range starting above 10 MHz. For example, when the interference component 304a is caused by transmitter leakage, the difference between a transmitter band and receiver band in a wireless standard (duplex distance) can be as low as 30 MHz, and in some special cases may be as low as 22 MHz. The interference component 304a has a higher strength than the desired signal component 302a (as denoted in FIG. 3a by the Blocker signal being higher than the RX signal). The dotted line 306a shows the attenuation that is applied by the low-pass filter (comprising the capacitor 204) to the signal output from the mixer 202. It can be seen that in FIG. 3a the signal output from the mixer 202 is not significantly attenuated over the frequency range of the desired signal component 302a. However, the capacitance of the capacitor 204 is set such that the capacitor 204 does attenuate the signal output from the mixer 202 at the frequency range of the interference (or "blocker") signal components 304a, as is shown by the line 306a dropping below the line 308a (wherein the line 308a represents having no attenuation applied to the output of the mixer 202).

FIG. 3b is similar to FIG. 3a but the capacitance of the capacitor 204 has been increased, thereby producing the situation shown in FIG. 3b. Since the capacitance of the capacitor 204 is higher in FIG. 3b, the cut off frequency of the low pass filter provided by the capacitor 204 is lower. This can be seen in that the line 306b drops below the line 308b for lower frequencies than in FIG. 3a. In particular, the capacitor 204 in FIG. 3b will attenuate the desired signal components of the signal output from the mixer 202, thereby causing inband droop, as shown in FIG. 3b.

It may be important to correctly set the capacitance of the capacitor 204 such that the cut off frequency of the low pass filter provided by the capacitor 204 is set at the correct level. Setting a high cut off frequency as in FIG. 3a reduces inband droop, but also provides less attenuation of the interference signal components 304a. In contrast setting a low cut off frequency as in FIG. 3b increases inband droop, but provides greater attenuation of the interference signal components 304b.

Low inband droop is desirable because inband droop degrades the Error Vector Magnitude (EVM) of the desired signal components. However, high attenuation of the interference signal components 304 is also desirable because by attenuating the interference components to a greater extent the downstream blocks in the receiver (e.g., the baseband processing block 108) can be simplified, e.g., by relaxing the linearity and filtering requirements of the downstream blocks.

It can therefore be appreciated that, in the mixer block 200, a balance should be reached between the competing aims of reducing inband droop and increasing attenuation of interference signals components, and that the capacitance of the capacitor 204 is set according to the balance.

The general diagram of the radio frequency receiver 100 in FIG. 1 applies in some embodiments. However, in some embodiments, the mixer block 106 is not implemented as shown in FIG. 2 as described above. Instead the mixer block is implemented so as to include an LC based notch filter, as described in more detail below.

Figure 4:
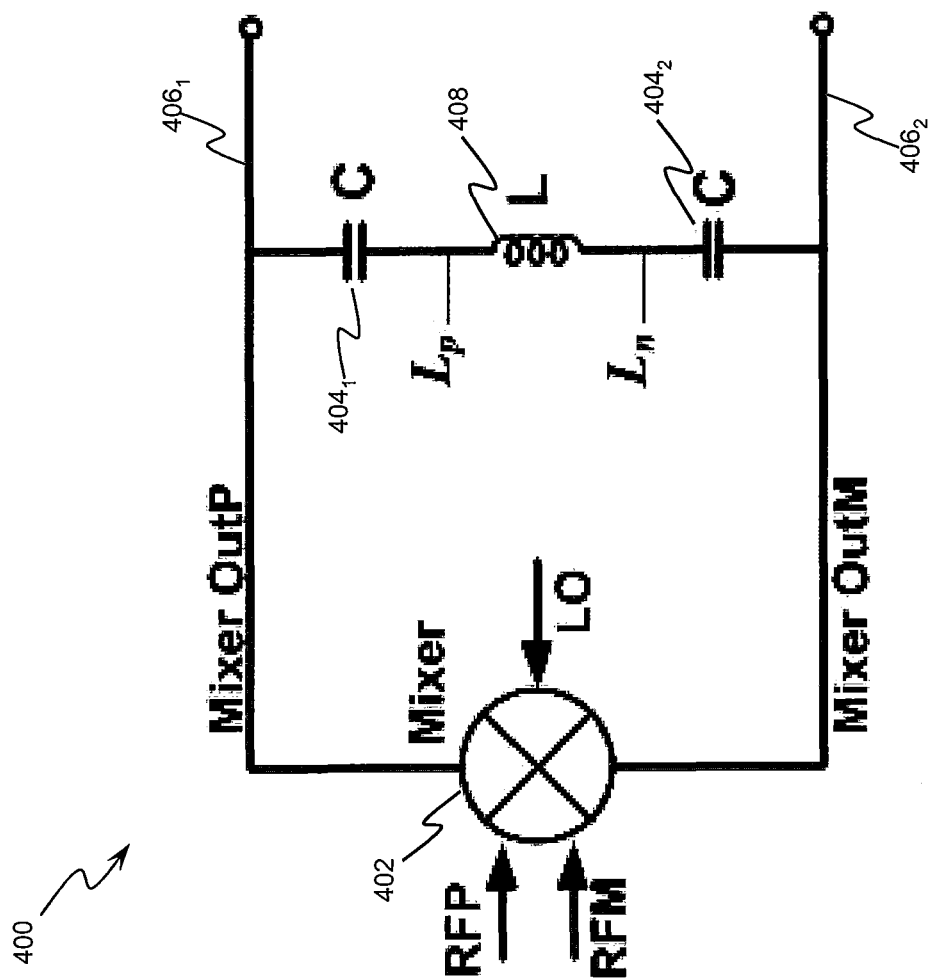
FIG. 4 shows a first circuit diagram of a mixer block according to a first embodiment.

FIG. 4 shows a circuit diagram of a mixer block 400 according to a first embodiment. The mixer block 400 comprises a mixer 402, two capacitors $404_1$ and $404_2$, two output lines $406_1$ and $406_2$, and an inductor 408. FIG. 4 shows that the input to the mixer block 400 is a differential input denoted RFP and RFM, and the differential inputs are received at the mixer 402. The mixer 402 also receives a local oscillator (LO) signal which is generated by a local oscillator on the receiver 100 and which acts as a clock signal having a particular frequency $f_{LO}$. The mixer 402 outputs a differential output signal which is output on the two output lines $406_1$ and $406_2$. The differential output lines $406_1$ and $406_2$ are connected together via the two capacitors $404_1$ and $404_2$ and the inductor 408 which are arranged in series as shown in FIG. 4. That is to say, the first capacitor $404_1$ is coupled to the first output line $406_1$ and coupled to the inductor 408. The inductor 408 is also coupled to the second capacitor $404_2$ which is itself coupled to the second output line $406_2$.

In operation, the capacitors $404_1$ and $404_2$ and the inductor 408 act as a notch filter (an LC based notch filter) on the output of the mixer 402. As described above, capacitors block low frequency signals but allow high frequency signals to pass through them. In contrast, inductors block high frequency signals but allow low frequency signals to pass through them. Therefore, only a particular range of frequency components of the signal output from the mixer 202 can pass between the differential output lines $406_1$ and $406_2$ (that is, only frequencies which are high enough to pass through the capacitors $404_1$ and $404_2$ but low enough to pass through the inductor 408). Frequency components of the differential output from the mixer 402 which are within the particular range of frequencies are blocked by the LC notch filter (made up of the capacitors $404_1$ and $404_2$ and the inductor 408). However, frequency components which are below the particular range cannot pass between the differential output lines $406_1$ and $406_2$ due to the capacitors $404_1$ and $404_2$; whilst frequency components which are above the particular range cannot pass between the differential output lines $406_1$ and $406_2$ due to the inductor 408. Therefore, frequency components of the differential output from the mixer 402 which are outside of the particular range are not blocked by the LC notch filter and are passed on to the baseband processing block 108 from the mixer block 400. In this way the arrangement of the capacitors $404_1$ and $404_2$ and the inductor 408 acts as an LC notch filter applied to the differential output of the mixer 202.

The receiver 100 in which the mixer block is implemented may be part of a transceiver and may not include SAW filters (Surface Acoustic Wave filters). Indeed it is becoming common to avoid the use of SAW filters between the receiver and transmitted chains in a transceiver. This tends to increase the dynamic range and linearity requirements of the blocks in the receiver chain, especially if the duplex distance in the transceiver is small. The mixer block design in embodiments described herein is used in the receiver chain to suppress higher transmitter leakage on full-duplex transceivers.

Figure 5:
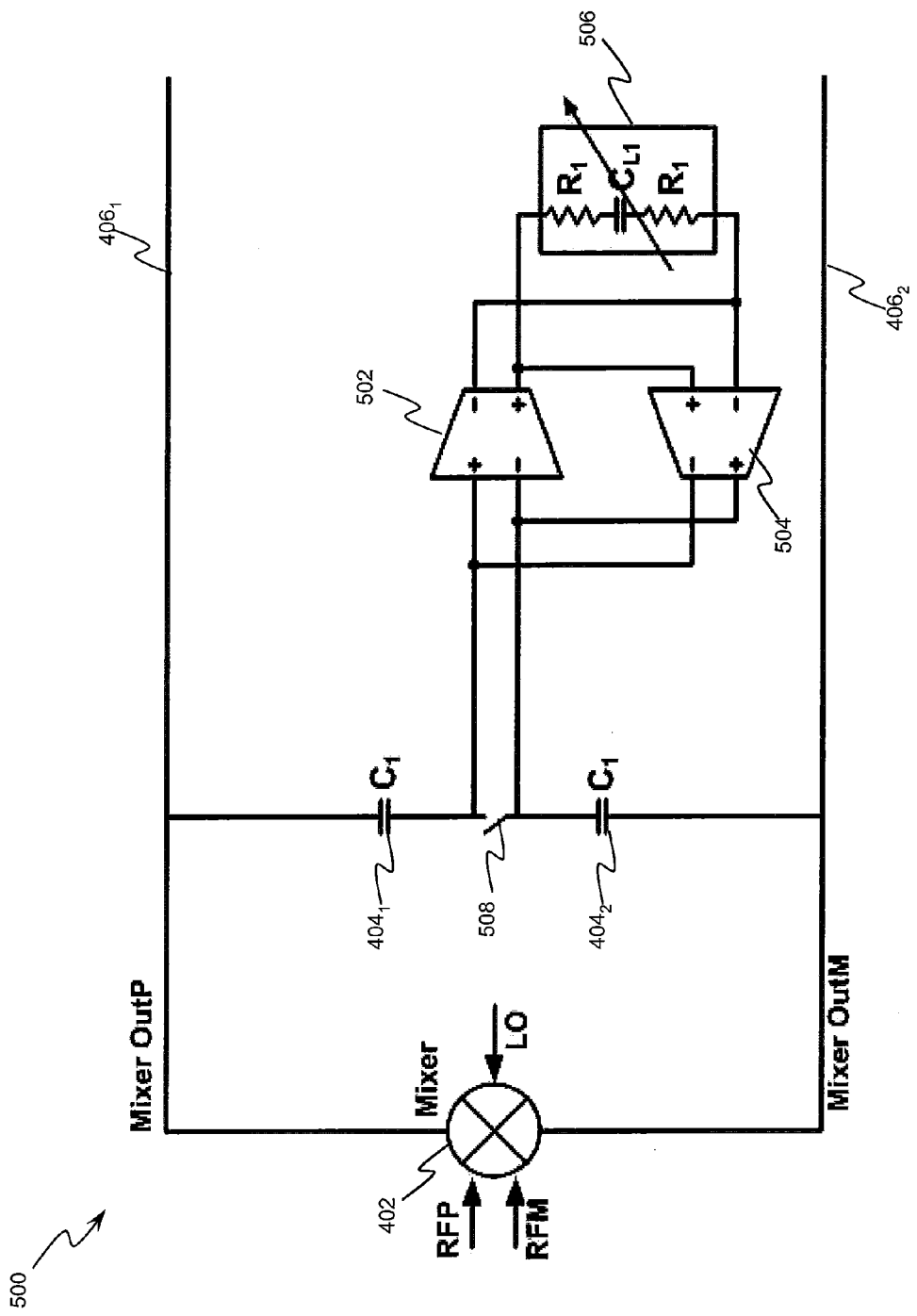
FIG. 5 shows a second circuit diagram of a mixer block according to the first embodiment.

FIG. 5 shows a second circuit diagram of the mixer block (denoted 500) according to the first embodiment. Physical inductors can be large and expensive. For this reason, the inductor 408 shown in FIG. 4 can be implemented using smaller and cheaper circuitry as shown in FIG. 5. This is particularly useful where the circuitry is to be used in a mobile user terminal for which size and cost are important factors in the design of the user terminal. The inductor 408 is replaced by two transconductors 502 and 504 and an RC block 506 which has variable resistance and variable capacitance, which are arranged as shown in FIG. 5. The combination of the transconductors 502 and 504 as it is shown in FIG. 5 forms a gyrator. The positive input of the first transconductor 502 is coupled to the first capacitor $404_1$. The negative input of the first transconductor 502 is coupled to the second capacitor $404_2$. The positive output of the first transconductor 502 is coupled to the positive input of the second transconductor 504 and to a first side of the RC block 506. The negative output of the first transconductor 502 is coupled to the negative input of the second transconductor 504. A second side of the RC block 506 is coupled to the negative input of the second transconductor 504. The positive output of the second transconductor 504 is coupled to the negative input of the first transconductor 502 and to the second capacitor $404_2$. The negative output of the second transconductor 504 is coupled to the positive input of the first transconductor 502 and to the first capacitor $404_1$. The first capacitor $404_1$ is connected to the second capacitor $404_2$ via a switch 508.

As is known in the art, the arrangement of Gm gyrator (formed from transconductors 502 and 504) and the RC block 506 shown in FIG. 5 acts as an inductor (in place of inductor 408 in FIG. 4) in the mixer block 500.

Figure 6:
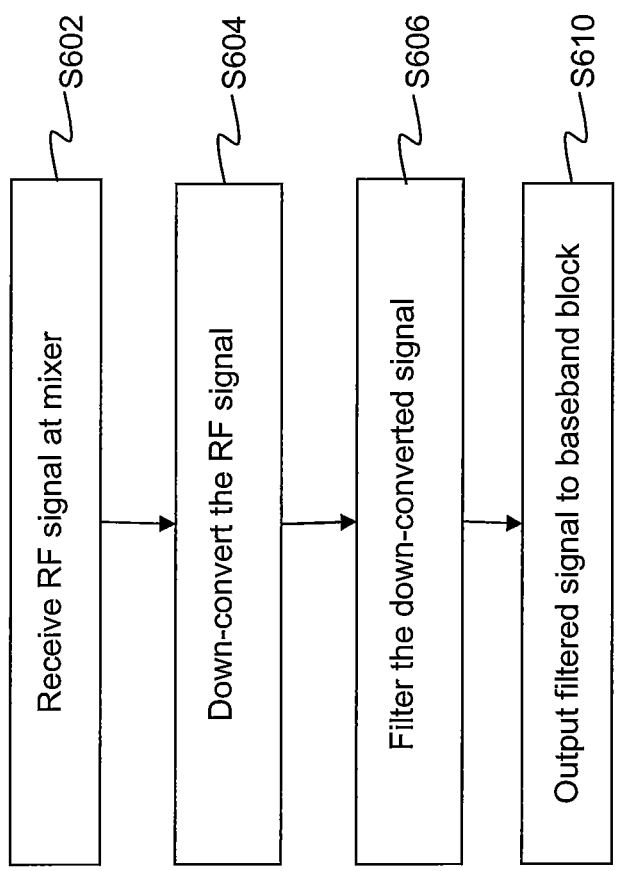
FIG. 6 is a flow chart for a process of processing a radio frequency signal in a radio frequency receiver according to a preferred embodiment.

With reference to FIG. 6, there is now described a method of processing a radio frequency signal in the radio frequency receiver 100 according to a preferred embodiment. A radio frequency (RF) signal is received at the antenna 102 over a wireless interface. The RF signal is amplified by the LNA 104 and then passed to the mixer block. In a step S602 the RF signal is received at the mixer 402 of the mixer block. As shown in FIGS. 4 and 5, the RF signal is received as a differential input signal at the mixer 402. The mixer 402 also receives the LO signal from a local oscillator on the receiver 100. The LO signal acts as a clock signal.

In a step S604 the mixer 402 down-converts the RF signal using the LO signal. The operation of the mixer 402 is known in the art. The mixer 402 outputs differential outputs "Mixer OutP" on output line $406_1$ and "Mixer OutM" on output line $406_2$.

In a step S606 the differential outputs from the mixer 202 are filtered using the LC notch filter which comprises the capacitors $404_1$ and $404_2$, the Gm gyrator 502 and 504 and the RC block 506, as shown in FIG. 5. In a step S608 the filtered signal is output from the mixer block to the baseband processing block 108 for further processing.

Figure 7:
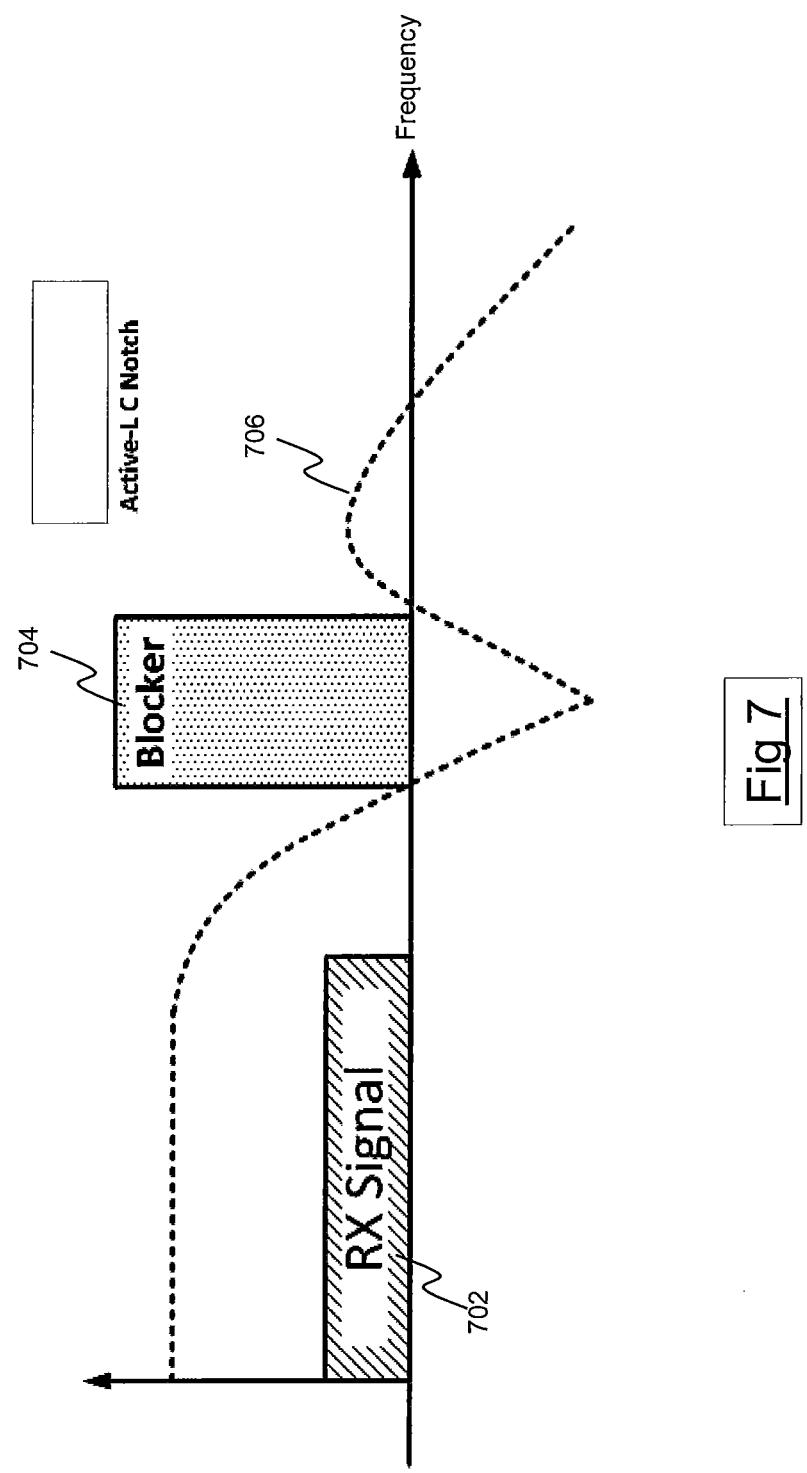
FIG. 7 shows a graph representing the effect of an LC based notch filter on the signal output from a mixer according to the first embodiment.

FIG. 7 shows a graph representing the effect of the LC notch filter in the mixer block 500 on the signal output from the mixer 402. FIG. 7 shows the desired signal component 702 (denoted "RX Signal") which has a frequency range of approximately 0 to 10 MHz. At a higher frequency there is some interference component 704 in the signal (denoted "Blocker"). As described above, the frequency range of the interference component 704 could be any frequency range starting above 10 MHz. As an example, when the interference component 704 is caused by transmitter leakage, the difference between a transmitter band and receiver band in a wireless standard (duplex distance) can be as low as 30 MHz, and in some special cases may be as low as 22 MHz. The interference component 704 has a higher strength than the desired signal component 702 (as denoted in FIG. 7 by the Blocker signal being higher than the RX signal). The dotted line 706 shows the attenuation that is applied by the LC based notch filter (in the mixer block 500) to the signal output from the mixer 402. It can be seen in FIG. 7 that the signal output from the mixer 402 is not significantly attenuated over the frequency range of the desired signal component 702. However, the notch filter has a notch (i.e., a frequency at which the attenuation is higher than at frequencies either side of the notch) and the notch is centered within the frequency range of the interference (or "blocker") signal components 704. This is shown by the line 706 having a minimum at a point within the frequency range of the interference components 704.

Since the notch of the notch filter is centered within the frequency range of the interference components 704 in the signal output from the mixer 402, the interference is strongly attenuated. In particular, the interference in the signal output from the mixer 402 is attenuated more strongly by the notch filter of preferred embodiments than by the low pass filter of the mixer block 200. This can be seen by comparing FIG. 7 with FIGS. 3a and 3b. Since the interference components are more strongly attenuated, the processing blocks downstream of the mixer block 106 in the receiver 100 do not require such strict requirements, such as filter requirements or linearity requirements. Therefore the blocks in the receiver 100 downstream of the mixer block (e.g., the baseband processing block 108) can be simplified such that they may be cheaper and consume less power than in prior art receivers.

Furthermore, as can be seen in FIG. 7, the LC notch filter shown in FIG. 5 does not cause significant attenuation in the frequency range of the desired signal components. In other words, the LC notch filter does not cause significant inband droop in the desired signal components. This is desirable because inband droop degrades the EVM of the desired signal. To put it another way, the LC notch filter strongly attenuates the interference components, but does not strongly attenuate the desired signal components, in the signal output from the mixer 402. This is advantageous for many reasons as is known in the art, some of the reasons being given above, although there are other reasons why attenuating interference components but not attenuating desired signal components may be advantageous, depending upon the implementation of the receiver in which the mixer block of the preferred embodiments is used.

The Gm gyrator 502 and 504 is powered, which causes extra power consumption in the mixer block 500, as compared to mixer block 200. However, due to the relaxation in the requirements (e.g., linearity requirements) of the baseband processing block 108, the power consumption of the baseband processing block 108 is reduced when using the mixer block 500, as compared to when using the mixer block 200. Therefore, using the mixer block 500 results in lower power consumption in the receiver 100 as a whole, as compared to when using the mixer block 200.

Adjusting the power supply to the Gm gyrator (502 and 504) adjusts the frequency of the notch of the notch filter. The frequency of the notch of the LC notch filter can also be adjusted by changing the capacitance of the capacitors 404$_1$, 404$_2$, and the capacitor $C_{L1}$ in the RC block 506. For simplicity, in some embodiments, the frequency of the notch is changed by changing the capacitor $C_{L1}$ in RC block 506. Therefore the frequency of the notch of the notch filter can be tuned. In this way the notch filter can be optimized to attenuate specific interference components which occur over specific frequency ranges. For example, where the receiver 100 is part of a transceiver, the frequency of the interference components caused by transmitted signals can be determined and then the notch of the notch filter can be centered within the frequency range of the interference components caused by the transmitted signals. In general, this approach can be used to tune the frequency of the notch of the notch filter to attenuate any interference components. In this sense, the frequency of an interference component in the down-converted signal from the mixer 402 can be determined, and the frequency of the notch of the notch filter can be adjusted in dependence upon the determined frequency of the interference component, e.g., by adjusting the power supply to the Gm gyrator (502 and 504) or by adjusting the capacitance of the capacitors 404$_1$, 404$_2$, and/or $C_{L1}$ in RC block 506. Furthermore, the Gm value of the gyrator can be tuned by changing the power supply voltage as Gm value changes by process and temperature.

The resistance of the resistors marked R1 in the RC block 506 determines the Q value (or quality factor) of the LC notch filter. The Q value determines the width (in frequency-space) of the notch of the notch filter. A high Q value means that the notch is narrow such that the notch filter attenuates only a small frequency range centered on the frequency of the notch. Whereas, a low Q value means that the notch is wide such that the notch filter attenuates a large frequency range centered on the frequency of the notch. The Q value of the notch filter is set to be sufficiently high such that the notch filter does not significantly attenuate the desired signal component in the down-converted signal outputted from the mixer 402. In this way the LC notch filter shown in FIG. 5 avoids causing inband droop. The Q value of the notch filter can be set in dependence upon the frequency of the interference components and the frequency of the desired signal components. Where there is a large frequency gap between the interference components and the desired signal components then the Q value is not set to be as high (since this is not required to avoid causing inband droop), as compared to where there is a small frequency gap between the interference components and the desired signal components. Furthermore, the Q value of the notch filter can be set in dependence upon the size of the frequency range of the interference components, such that the notch attenuates the signal output from the mixer 402 over the whole (or at least a significant portion of) the frequency range of the interference components. In this sense, the frequency range over which the interference component in the down-converted signal extends can be determined, and the Q value of the notch filter can be adjusted in dependence upon the determined frequency range of the interference component, by adjusting the resistance of the resistors in the RC block 506.

In some cases the frequency range of the interference components in the signal may be too large to be adequately attenuated using a single notch filter. For example, in some wireless standards (such as the 3GPP Long Term Evolution (LTE) standard), the bandwidth of a communication channel can be as large as 20 MHz. Therefore the transmitted signals which are causing interference in the received signal will be spread over a large frequency range. Rather than decreasing the Q value of the notch to such an extent to attenuate the whole of the interfering frequency range (since this would most likely increase the inband droop caused by the notch filter) the notch filter can be adapted to have multiple notches, which can be distributed over the interfering frequency range. The multiple notches can be achieved with multiple notch networks connected to the output lines 406$_1$ and 406$_2$ of the mixer 402.

Figure 8:
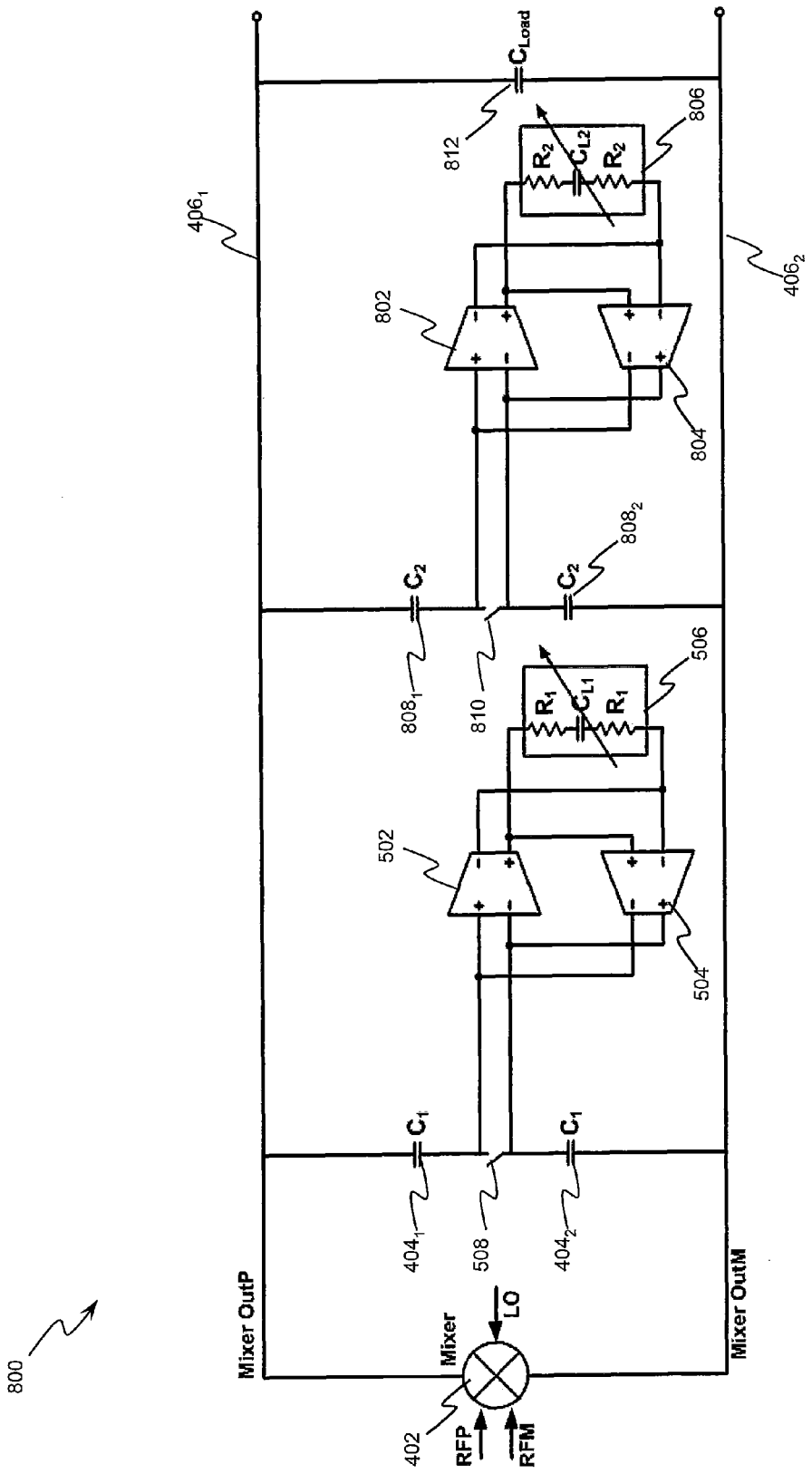
FIG. 8 shows a circuit diagram of a mixer block according to a second embodiment.

For example, the mixer block 800 shown in FIG. 8 comprises two notch networks. The first notch network corresponds to the circuitry in mixer block 500 (and corresponding elements are denoted with corresponding reference numerals). The second notch network shown in FIG. 8 comprises another Gm gyrator (formed of transconductors 802 and 804), an RC block 806, two capacitors 808$_1$, 808$_2$, and a switch 810, arranged as shown in FIG. 8. The capacitor $808_1$ is connected to the first output line $406_1$. The capacitor $808_2$ is connected to the second output line $406_2$. The capacitors $808_1$ and $808_2$ are connected to each other via the switch 810. The positive input of the transconductor 802 is coupled to the capacitor $808_1$. The negative input of the transconductor 802 is coupled to the capacitor $808_2$. The positive output of the transconductor 802 is coupled to the positive input of the transconductor 804 and to a first side of the RC block 806. The negative output of the transconductor 802 is coupled to the negative input of the transconductor 804. A second side of the RC block 806 is coupled to the negative input of the transconductor 804. The positive output of the transconductor 804 is coupled to the negative input of the transconductor 802 and to the capacitor $808_2$. The negative output of the transconductor 804 is coupled to the positive input of the transconductor 802 and to the capacitor $808_1$. The capacitance denoted $C_{Load}$ 812 in FIG. 8 represents the total capacitance of the block following the mixer block in the receiver chain (e.g., the baseband processing block 108).

As described above the inband droop depends upon the Q value of the notch filter. The inband droop also depends on the output impedance of the mixer 402 ($R_{mixer}$) and on the total capacitive load seen by the mixer 402 (which is $C_{Load}$+C1+C2). The first notch network provides a first notch within the interference frequency range. The second notch network provides a second notch within the interference frequency range, but which is at a different frequency to the first notch. In this way the two notch networks can provide a notch filter which attenuates the interference components over a large frequency range, without requiring the Q value of the notch filter to be reduced too much, thereby avoiding (or at least reducing) unwanted inband droop.

The switches 508 and 710 are left open in order to implement the LC based notch filter described above. However, if the system does not require large attenuations of the interference components in the received signal (e.g., if the transmit channel bandwidth is low and the duplex distance in the transceiver is large) then the switches 508 and 710 may be closed. The inductor (implemented with the gyrator circuitry described above) is then by-passed such that the filter acts as a first-order RC low pass filter. Therefore when a notch is not required, the LC notch circuitry can be disabled by disabling the Gm gyrators 502, 504, 802, and 804 and shorting their inputs using the switches 508 and 710. This saves power and reduces the noise in the system.

The noise contribution of the Gm gyrators 502, 504, 802, and 804 is attenuated significantly at the output of the mixer 402 due to the mixer 402 having a low output impedance. Furthermore, as shown below, the noise transfer functions of the Gm gyrators have band-pass characteristics (i.e., they resonate at their notch frequency), which have at least one zero at DC (zero frequency) that results in noise attenuation at desired signal frequencies. The noise transfer function ($\overline{v_{nrms,L}^2}$) of the notch filter network of the mixer block 106 is given by:

$$\overline{v_{nrms,L}^2}(s) = 4KTg_m\delta\left|\left(\frac{g_m(sC_1R_{mixer})}{b_0+b_1s+b_2s^2+b_3s^3}\right)\right|^2 + 4KTg_m\delta\left|\left(\frac{s^2C_1C_LR_{mixer}}{b_0+b_1s+b_2s^2+b_3s^3}\right)\right|^2$$

where, $b_0=g_m^2$, $b_0=g_m^2$, $b_1=g_m^2R_{mixer}(C_1+C_{Load})$, $b_2=C_1C_{L1}$, and $b_3=C_1C_{Load}C_{L1}R_{mixer}$, and where K is the Boltzmann constant and T is the temperature at which the mixer block is operating, $g_m$ represents the transconductance values of the transconductors 502 and 504. $R_{mixer}$ is the output impedance of the mixer 402 seen from the output node. δ represents a constant in the noise equation in order to mimic the noise of a transconductor block in terms of a resistor noise. $C_1$ is the capacitance of the capacitors 404, $C_{Load}$ is the capacitance of the capacitor 812 which represents the input capacitance of the baseband block 108, and $C_{L1}$ is the capacitance of the capacitor in the RC block 506. The equation above demonstrates the noise transfer functions of the transconductors 502 and 504 in the Laplace transform format, where 's' represents the Laplace variable. For simplicity it is assumed that the resistance, R1, of the RC block 506 is zero. The first term in the above equation shows the noise contribution of block 502, whereas the second term represents the noise contribution of block 504. It can be seen that there is an $R_{mixer}$ term in the numerator of the transfer functions, such that it can be appreciated that a lower mixer impedance results in a lower noise contribution of the Gm gyrators.

Similarly, the distortion requirements of the Gm gyrators 502, 504, 802, and 804 are very relaxed for two reasons. Firstly, distortion due to the Gm gyrators is reduced significantly at the output of mixer, due to the low mixer output impedance. The total distortion due to the Gm gyrators ($\overrightarrow{D_{total,L}}$) is given by the equation:

$$\overrightarrow{D_{total,L}}(s) = \overrightarrow{D_{gm1,L}}\left(\frac{g_m(sC_1R_{mixer})}{b_0+b_1s+b_2s^2+b_3s^3}\right) + \overrightarrow{D_{gm2,L}}\left(\frac{s^2C_1C_{L1}R_{mixer}}{b_0+b_1s+b_2s^2+b_3s^3}\right)$$

where, $\overrightarrow{D_{gm1,L}}$ the distortion due to the transconductor 502 at the 'gm1' output, in vector format and $D_{gm2,L}$ is the distortion due to the transconductor 504 at the 'gm2' output, in vector format. ($\overrightarrow{D_{total,L}}$) is the total distortion at the output of the mixer 402, which is the vector summation of 'Dgm1,L' and 'Dgm2,L' after they have been multiplied with appropriate transfer functions. The distortion transfer function has at least a zero at DC, such that distortion components are attenuated significantly within the desired bandwidth. The above equation demonstrates the distortion transfer functions of the transconductors (502 and 504) in Laplace transform format, where 's' represents the Laplace variable. The first term in the above equation shows the distortion contribution of block 502, whereas the second term represents the distortion contribution of block 504. Again, for simplicity, the resistance, R1, of the RC block 506 is assumed to be zero.

Secondly, the signal levels in the mixer block are relatively low because they are introduced before the baseband processing block 108 in the receiver chain, which generally has the highest gain on the chain.

The bandwidth of the Gm gyrators has to be as high as the highest notch frequency. However, the transconductance gain of the gyrators does not need to be constant throughout the whole bandwidth, as it can be adjusted by changing the capacitance of the capacitor marked $C_{L1}$ in the RC block 506 (and of the capacitor marked $C_{L2}$ in the RC block 806 in FIG. 8).

The quality factor (or "Q value") of the inductor can be reduced by including resistors in the mixer block 500 at the input of the first transconductor 502. The noise transfer functions of the resistors at the input of the transconductor 502 will see the same transfer function as that of the transconductor 502, which has only one zero at DC. On the other hand, resistors across the CL (in the RC block 506) will see the same noise transfer function as the second transconductor 504, which has two zeros at DC. Thus, the noise contribution of the resistors becomes much lower by including them at the input of the first transconductor 502.

The notch filters included in the mixer blocks described herein can give approximately 20 dB attenuation throughout the frequency range of the interference corresponding to the transmitted signals, with less than 1 dB in-band droop. This relaxes the second order intercept point (IIP2) and the third order intercept point (IIP3) requirements of the baseband processing block 108 by 40 dB and 60 dB respectively.

Figure 9:
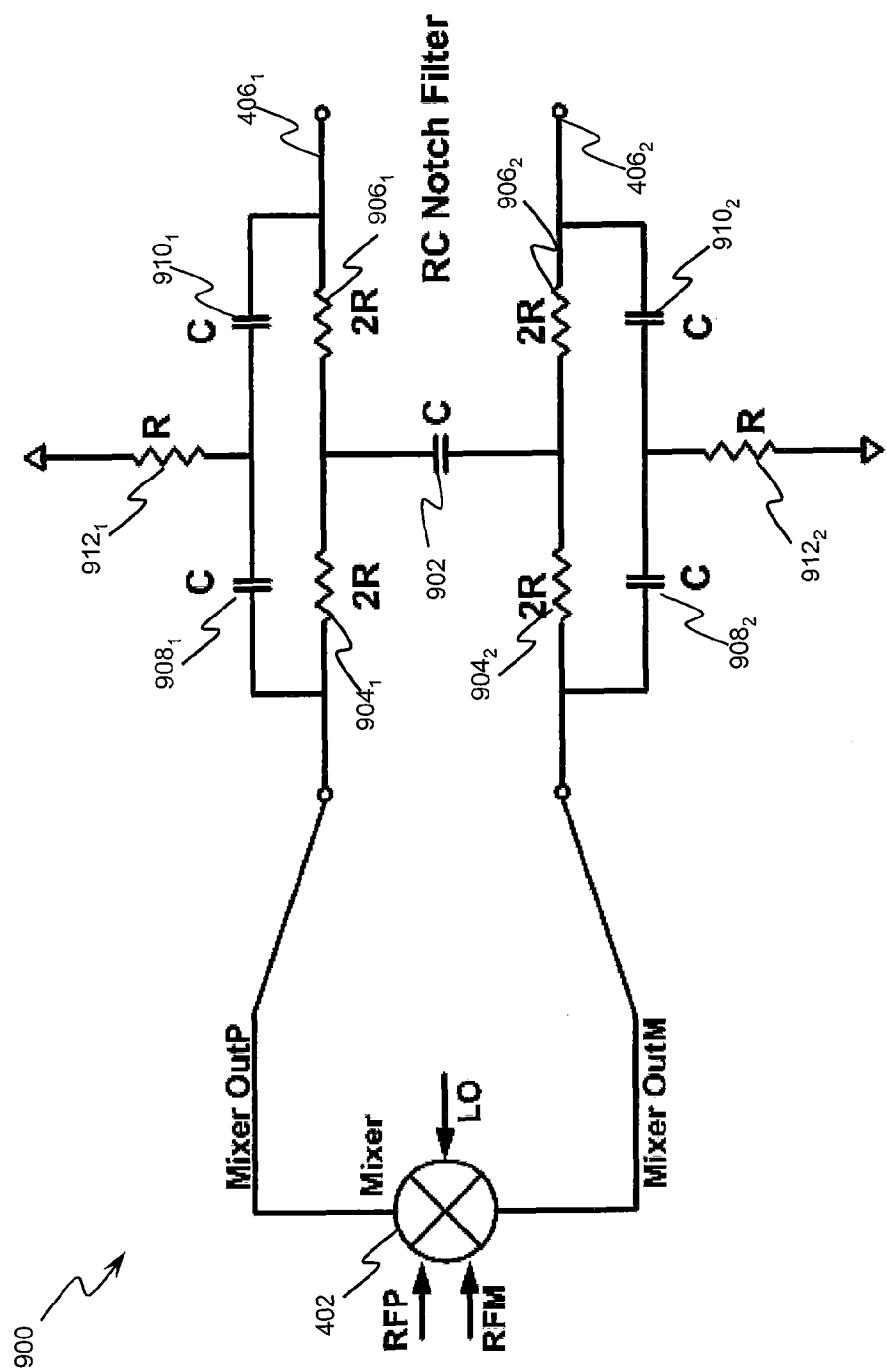
FIG. 9 shows a circuit diagram of another mixer block.

Another mixer block 900 is shown in FIG. 9. The mixer block 900 implements a notch filter as an RC based notch filter, rather than the LC based notch filter of the embodiments described above. The mixer block 900 includes a mixer 402 which corresponds to the mixer 402 described above. The mixer block 900 includes differential output lines $406_1$ and $406_2$ which correspond to the differential output lines $406_1$ and $406_2$ described above.

The mixer block 900 is arranged as shown in FIG. 9. That is to say, the first output line $406_1$ includes a pair of resistors $904_1$ and $906_1$ arranged in series. In parallel to the pair of resistors are a pair of capacitors $908_1$ and $910_1$ which are arranged in series with respect to each other. The junction between the two capacitors $908_1$ and $910_1$ is connected to ground via a resistor $912_1$. The junction between the two resistors $904_1$ and $906_1$ is connected to a first side of a capacitor 902. Similarly, the second output line $406_2$ includes a pair of resistors $904_2$ and $906_2$ arranged in series. In parallel to the pair of resistors are a pair of capacitors $908_2$ and $910_2$ which are arranged in series with respect to each other. The junction between the two capacitors $908_2$ and $910_2$ is connected to ground via a resistor $912_2$. The junction between the two resistors $904_2$ and $906_2$ is connected to a second side of the capacitor 902. Therefore the two output lines $406_1$ and $406_2$ are connected to each other via the capacitor 902.

Figure 10:
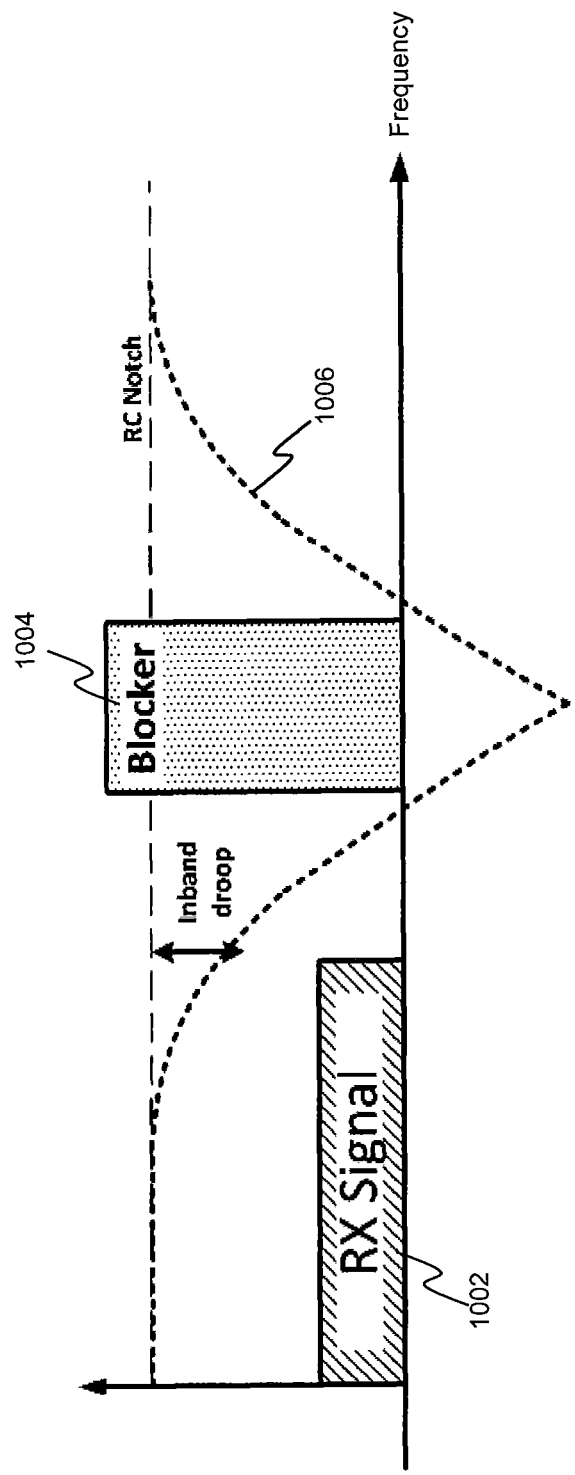
FIG. 10 shows a graph representing the effect of an RC based notch filter on the signal output from a mixer.

FIG. 10 shows a graph representing the effect of the RC notch filter in the mixer block 900 on the signal output from the mixer 402. FIG. 10 shows the desired signal component 1002 (denoted "RX Signal") which has a frequency range of approximately 0 to 10 MHz. At a higher frequency there is some interference component 1004 in the signal (denoted "Blocker"). The interference component 1004 has a higher strength than the desired signal component 1002 (as denoted in FIG. 10 by the Blocker signal being higher than the RX signal). The dotted line 1006 shows the attenuation that is applied by the RC based notch filter (in the mixer block 900) to the signal output from the mixer 402. It can be seen in FIG. 10 that the notch filter has a notch (i.e., a frequency at which the attenuation is higher than at frequencies either side of the notch) and that the notch is centered within the frequency range of the interference (or "blocker") signal components 1004. This is shown by the line 1006 having a minimum at a point within the frequency range of the interference components.

The RC notch filter of the circuit 900 operates such that at low frequencies the output signal from the mixer cannot pass through any of the capacitors and therefore the output signal from the mixer 402 passes through the resistors ($904_1$, $906_1$, $904_2$, and $906_2$) and onto the output lines $406_1$ and $406_2$ without being attenuated. At higher frequencies the signal output from the mixer 402 can pass through the capacitor 902 between the differential output lines $406_1$ and $406_2$, thereby attenuating the output signal at those frequencies. At higher frequencies still, all of the capacitors allow the output signal from the mixer 402 to pass through them. The impedance through the resistors $904_1$ and $906_1$ is then higher than the impedance through the capacitors $908_1$ and $910_1$, such that the output signal flows through the capacitors $908_1$ and $910_1$ rather than through the resistors $904_1$ and $906_1$. Therefore the output signal does not pass between the output lines $406_1$ and $406_2$, such that the output signal at high frequencies is not attenuated by the RC notch filter. This explains the shape of the line 1006 in FIG. 10 which shows that at very low and very high frequencies, there is very little attenuation of the output signal, whereas at intermediate frequencies there is a high level of attenuation. This creates the notch shown in FIG. 10. The frequency of the notch of the RC notch filter can be adjusted by varying the capacitance of the capacitors in the circuit and by varying the resistance of the resistors in the circuit appropriately such that the notch is centered within the frequency range of the interference components in the output signal from the mixer 402 (similar to setting the notch of the LC based notch filter as described above).

The RC notch filter shown in FIG. 9 provides high attenuation of the interference components (as shown in FIG. 10), which as described above relaxes the linearity requirements of subsequent processing blocks in the receiver chain (e.g., the baseband processing block 108), thereby resulting in less power consumption and less area being used in the subsequent processing blocks. As compared to the LC based notch filter described above, the RC notch filter shown in FIG. 9 does not require any extra current consumption. The RC notch filter is passive, whereas the LC notch filter described above (implemented using the gyrators) is active and therefore the RC notch filter consumes less current than the LC based notch filter. However, as shown in FIG. 10 the RC notch filter produces a greater inband droop than the LC notch filter described above (which can be seen by comparing FIG. 10 with FIG. 7). As described above, greater inband droop is not desirable because, for example, it causes greater EVM degradation. Furthermore, since the circuit 900 includes resistors arranged in series in the signal path, there is a significant noise penalty of using the RC notch filter, as compared to using the LC notch filter described above. There are competing factors in the design of the RC filter shown in FIG. 9 because in order to reduce the inband droop, the resistance of the resistors needs to be increased, but higher resistance in the signal path results in higher noise contributions in the output signal. The noise effect of the resistors must be balanced with the inband droop effect of the resistors. However, advantageously, with the LC notch filter of embodiments of the invention described above, the inband droop can be avoided without introducing detrimental levels of noise into the output signals. That is, the LC notch filter provides low in-band droop and high attenuation at minimal noise penalty when compared with the RC notch filter.

There have been described above some embodiments for using an LC based notch filter to filter the output of the mixer in a receiver. The notch of the LC notch filter is set to preferentially attenuate the interference components in the output signal outputted from the mixer before the signal is passed to the baseband processing block 108. This means that the requirements (e.g., linearity, filtering, IIP2 and IIP3 requirements) in the baseband processing block 108 can be relaxed which may result in a cheaper, smaller receiver which consumes less power, without introducing detrimental levels of noise or distortion into the signals. The mixer blocks of the embodiments described above can be implemented in cellular receivers such as Wideband Code Division Multiple Access (WCDMA) receivers or LTE receivers, or in any other type of receiver that can suffer from strong interferers.

As described above, the use of the mixer blocks of the embodiments described above relaxes the IIP2 requirements of the subsequent blocks in the receiver chain, and is therefore particularly advantageous where the receiver architecture is based on a zero-IF architecture, because in such an architecture, the IIP2 requirements of the following block typically becomes a bottleneck during the implementation of the receiver. The mixer design presented herein includes low power, low noise, programmable LC notch filter networks that suppress the transmitter leakage and some blockers, and thereby allows relaxation of the following block's specifications.

The embodiments of the invention described above will work effectively if the subsequent block 108 in FIG. 1 (which is, e.g., a baseband processing block) has high input impedance. If the block 108 has low impedance, such as if the block 108 is a feedback based transconductor amplifier, then the use of the LC notch filter in the mixer block may not provide such advantageous results as described above. However if the input impedance of the block 108 is capacitive as it is shown as $C_{Load}$ in FIG. 8, then the use of the LC notch filter in the mixer block will provide the desired results as described above.

While this invention has been particularly shown and described with reference to certain embodiments, it will be understood to those skilled in the art that various changes in form and detail may be made without departing from the scope of the invention as defined by the appendant claims.

What is claimed is:

1. Circuitry for use in a radio frequency receiver for processing a radio frequency signal, the circuitry comprising:
    a mixer arranged to:
        receive the radio frequency signal wherein the received radio frequency signal has an interference component; and
        down-convert the received radio frequency signal to a lower frequency, wherein the interference component in the down-converted signal is within an interference frequency range;
        output a differential output signal on two output lines; and
    an LC based notch filter comprising a capacitor, an inductor and a second capacitor arranged in series connecting together the two output lines, arranged to:
        receive the down-converted signal from the mixer;
        filter the down-converted signal, wherein the LC based notch filter has a notch centered within said interference frequency range, such that the LC based notch filter is arranged to attenuate the interference component in the down-converted signal; and
        output the filtered signal for processing by a baseband processing block.

2. The circuitry of claim 1 wherein the down-converted signal has a desired signal component within a signal frequency range which is distinct from the interference frequency range.

3. The circuitry of claim 2 wherein the LC based notch filter is configured, based on the output impedance of the mixer and on the capacitive load experienced by the mixer, to have a Q value which is sufficiently high such that the notch filter does not significantly attenuate the desired signal component in the down-converted signal.

4. The circuitry of claim 1 wherein the LC based notch filter is configured such that the frequency of the notch of the LC based notch filter is adjustable.

5. The circuitry of claim 1 wherein the LC based notch filter is configured such that the Q value of the LC based notch filter is adjustable.

6. The circuitry of claim 1 wherein the radio frequency receiver is part of a radio frequency transceiver and wherein the interference component of the received radio frequency signal is caused by a transmitted signal which is transmitted from the radio frequency transceiver.

7. The circuitry of claim 1 wherein the inductor comprises a powered gyrator and at least one further capacitor is included in the LC based notch filter.

8. The circuitry of claim 7 wherein the frequency of the notch of the notch filter is adjustable by adjusting one of: the power supplied to the gyrator; and the capacitance of at least one of the at least three capacitors.

9. The circuitry of claim 7 wherein the LC based notch filter further comprises at least one resistor having an adjustable resistance, and wherein the LC based notch filter is arranged such that the Q value of the LC based notch filter is adjusted by adjusting the resistance of the at least one resistor.

10. The circuitry of claim 1 wherein the LC based notch filter is configured to have a further notch at a frequency which is within said interference frequency range but which is different to the frequency of said notch.

11. A radio frequency receiver for processing a radio frequency signal, the radio frequency receiver comprising:
    a mixer arranged to:
        receive the radio frequency signal wherein the received radio frequency signal has an interference component;
        down-convert the received radio frequency signal to a lower frequency, wherein the interference component in the down-converted signal is within an interference frequency range; and
        output a differential output signal on two output lines;
    an LC based notch filter comprising a capacitor, an inductor and a second capacitor arranged in series connecting together the two output lines, arranged to:
        receive the down-converted signal from the mixer;
        filter the down-converted signal, wherein the LC based notch filter has a notch centered within said interference frequency range, such that the LC based notch filter is arranged to attenuate the interference component in the down-converted signal; and
        output the filtered signal; and
    a baseband processing block for processing the filtered signal outputted from the LC based notch filter.

12. A method of processing a radio frequency signal in a radio frequency receiver, the method comprising:
    receiving the radio frequency signal at a mixer of the radio frequency receiver, wherein the received radio frequency signal has an interference component;
    down-converting the received radio frequency signal to a lower frequency using the mixer, wherein the interference component in the down-converted signal is within an interference frequency range;
    outputting a differential output signal on two output lines;
    passing the down-converted signal from the mixer to an LC based notch filter of the radio frequency receiver, said LC notch filter comprising a capacitor, an inductor and a second capacitor arranged in series connecting together the two output lines;
    filtering the down-converted signal with the LC based notch filter, wherein the LC based notch filter has a notch centered within said interference frequency range, such that the LC based notch filter attenuates the interference component in the down-converted signal; and
    outputting the filtered signal from the LC based notch filter for processing by a baseband processing block.

13. The method of claim 12 further comprising:
determining the frequency of the interference component in the down-converted signal; and
adjusting the frequency of the notch of the LC based notch filter in dependence upon the determined frequency of the interference component.

14. The method of claim 12 further comprising:
determining the frequency range over which the interference component in the down-converted signal extends; and
adjusting the Q value of the LC based notch filter in dependence upon the determined frequency range of the interference component.

* * * * *